United States Patent [19]

Kasrazadeh et al.

[11] Patent Number: 4,722,046

[45] Date of Patent: Jan. 26, 1988

[54] CACHE STORAGE PRIORITY

[75] Inventors: Mehrzad Kasrazadeh, Palo Alto; Michael D. Taylor, San Jose; Jeffrey A. Thomas, Cupertino; Christopher D. Finan, Santa Clara; Joseph A. Petolino, Palo Alto, all of Calif.

[73] Assignee: Amdahl Corporation, Sunnyvale, Calif.

[21] Appl. No.: 920,803

[22] Filed: Oct. 17, 1986

Related U.S. Application Data

[63] Continuation-in-part of Ser. No. 900,640, Aug. 27, 1986.

[51] Int. Cl.[4] .............................................. G06F 13/14
[52] U.S. Cl. .................................................... 364/200
[58] Field of Search ... 364/200 MS File, 900 MS File; 370/85, 94; 340/825.5, 825.51

[56] References Cited

U.S. PATENT DOCUMENTS

| | | | |
|---|---|---|---|
| 3,810,114 | 5/1974 | Yamada et al. | 364/200 |
| 3,925,766 | 12/1975 | Bardotti et al. | 364/200 |
| 4,009,470 | 2/1977 | Danilenko et al. | 364/200 |
| 4,020,468 | 4/1977 | Silver et al. | 364/900 |
| 4,121,285 | 10/1978 | Chen | 364/200 |
| 4,231,091 | 10/1980 | Motz | 364/900 |
| 4,394,727 | 7/1983 | Hoffman et al. | 364/200 |
| 4,394,728 | 7/1983 | Comfort et al. | 364/200 |
| 4,399,503 | 8/1983 | Hawley | 364/200 |
| 4,477,872 | 10/1984 | Losq et al. | 364/200 |

Primary Examiner—David Y. Eng
Attorney, Agent, or Firm—Fliesler, Dubb Meyer & Lovejoy

[57] ABSTRACT

A data processing machine includes an instruction unit that decodes and organizes a flow of instructions for processing data. In response to certain instructions, the instruction unit generates requests for storage unit resources. In addition, results generated in the instruction unit in response to certain instructions are supplied for storage in the storage unit. The storage unit selects in response to priority logic from completing requests for storage unit resources, including a high speed cache storing data, and a plurality of storage ports for transferring data from the result register to the high speed cache. Each of the storage ports generates requests for access to the high speed cache to transfer the data stored in the respective store ports to the cache. Storage unit priority is determined in part by predicting the fullness of the storage ports.

6 Claims, 7 Drawing Figures

CACHE STORAGE PRIORITY

CONTINUING APPLICATION REFERENCE

The present invention is a continuation-in-part of U.S. patent application entitled CACHE STORAGE QUEUE, Ser. No. 06/900,640, filed Aug. 27, 1986, invented by Daberkow et al which is owned now and at the time of invention by a common assignee. The CACHE STORAGE QUEUE application is incorporated by reference as is fully set forth herein.

FIELD OF THE INVENTION

The present invention relates to the transfer of data in a data processing machine between the unit executing instructions and a high speed cache or similar storage device. In particular, the present invention relates to assigning priority to competing requests for cache resources.

BACKGROUND OF THE INVENTION

High speed data processing machines typically include an instruction unit that organizes a flow of instructions in a pipeline fashion and an execution unit interlocked with the instruction unit pipeline for executing instructions. Results from the execution of instructions are posted in a result register during a step of the instruction unit pipeline. Before the pipeline can continue wtih the following instructions, the results posted in the result register must be stored to free the result register.

The results are typically loaded from the result register into a storage facility that includes a high speed cache. The high speed cache allows the results to be quickly loaded from the result register into the cache, freeing the instruction unit pipeline to continue the following instructions.

The storage facility also services other sources of data and runs according to a separate pipeline or queue. In prior designs, the flow of the storage unit pipeline for storing results from the result register is required to be a very high priority flow to avoid causing excessive delay in the instruction unit pipeline. Such high priority flows "bump" requests from the storage unit pipeline from other sources. Consequently, a cache contention problem arises.

Prior art systems couple the result register containing data directly to the cache, so the results have to be held in the result register until the operation of transferring the data to the cache is successful. If the line to which the results are to be stored is not present in the cache, the instruction unit pipeline will wait until the storage facility brings the line in from main storage. In this situation, the instruction unit pipeline comes to a halt causing a degradation of performance.

The CACHE STORAGE QUEUE invention referred to above provides an apparatus for transferring data from the result register into a high speed cache that leads to a significant performance enhancement over prior designs and reduces cache contention. The CACHE STORAGE QUEUE provides a plurality of ports that receive data from the result register directly and are able to hold the data in a queue for supply to the cache as the cache resources become available for a store. By transferring the data from the result register into the storage queue ports, the instruction unit is free to proceed with the following instructions before the transfer of the data to the cache is complete.

Other sources of requests for access to cache resources include fetches of data by the instruction unit from the cache, transfers of data between the main storage system and the cache, and processes for other supporting systems utilizing the resources of the storage unit pipeline. The storage unit includes priority logic to select among competing requests for storage unit resources. The request having the highest priority for supply to the storage unit during a given cycle of a pipeline is selected. Thus by priority logic, the utilization of a storage unit resource is controlled.

As mentioned above, it is desirable that the instruction unit pipeline be able to proceed without suffering delays because of inability to obtain priority in the storage unit pipeline. Thus the priority logic is designed to maximize throughput of the instruction unit pipeline.

SUMMARY OF THE INVENTION

The present invention is a mechanism used to enhance the performance of the storage queue ports in aiding to maximize the throughput of the instruction unit pipeline by providing a prediction of the utilization of the storage queue ports and based on that prediction altering the priority of competing requests for storage unit utilization.

The present invention provides a data processing machine that comprises an instruction unit that decodes and organizes a flow of instructions for processing data. In response to certain instructions, the instruction unit generates requests for storage unit resources. In addition, results generated in the instruction unit in response to certain instructions are supplied for storage in the storage unit. The storage unit comprises means for selecting from competing requests for storage unit resources, a high speed cache storing data, and a plurality of storage port means for transferring data from the result register to the high speed cache. Each of the storage port means is responsive to storage queue control for generating requests for access to the high speed cache to transfer the data stored in the respective store port means to the cache.

The means for selecting from among competing requests for storage unit accesses receives the request from the plurality of store port means and from the instruction unit and selects a request for processing by the cache according to priority logic.

A means is provided for predicting utilization of the store port means for signalling the means for selecting from among competing requests in response to the prediction to select a request from one of the plurality of store port means as the highest priority request for processing by the cache.

By providing high priority to the store port means when it is predicted that the plurality of store port means will become full, the situation in which the instruction unit is interlocked with results stored in its result register until a store port means can be freed, is prevented.

DETAILED DESCRIPTION OF THE DRAWINGS

With reference to the figures, a detailed description of the preferred embodiment of the present invention.

Figure 1:
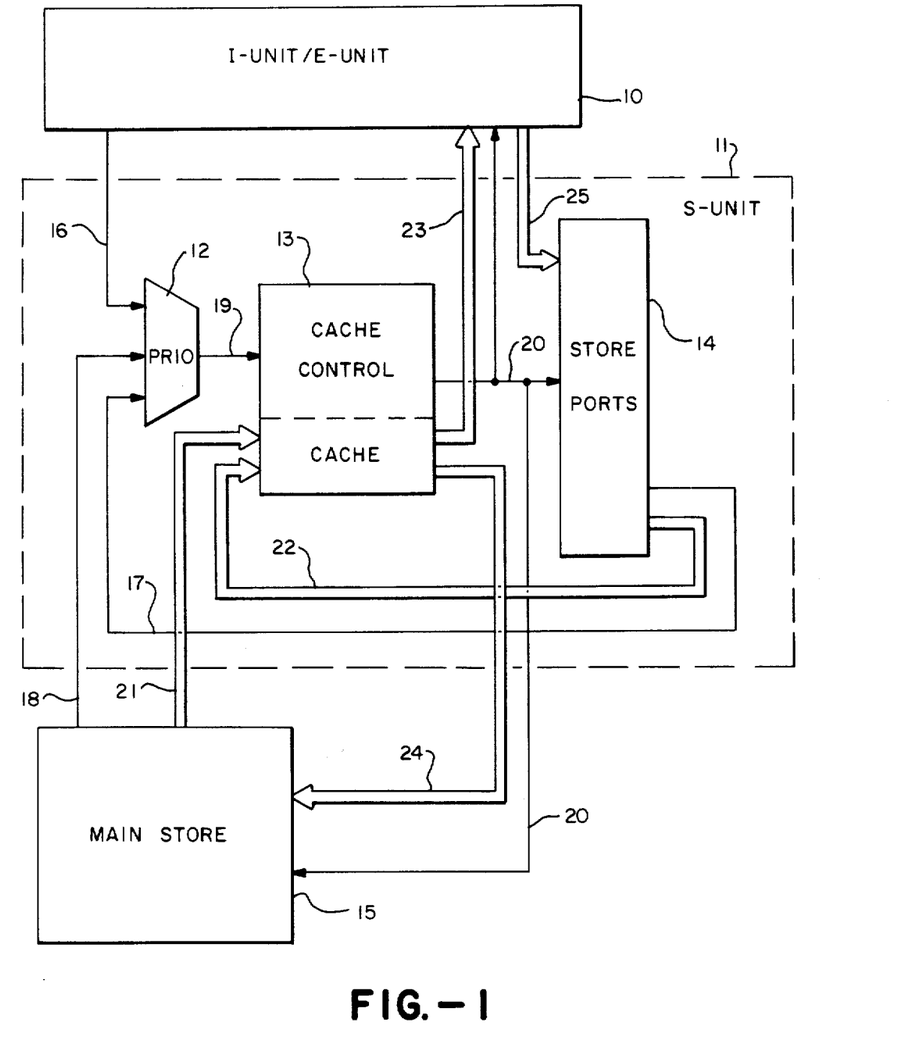
FIG. 1 provides an overview block diagram of the data processing system according to the present invention.
Figure 2A:
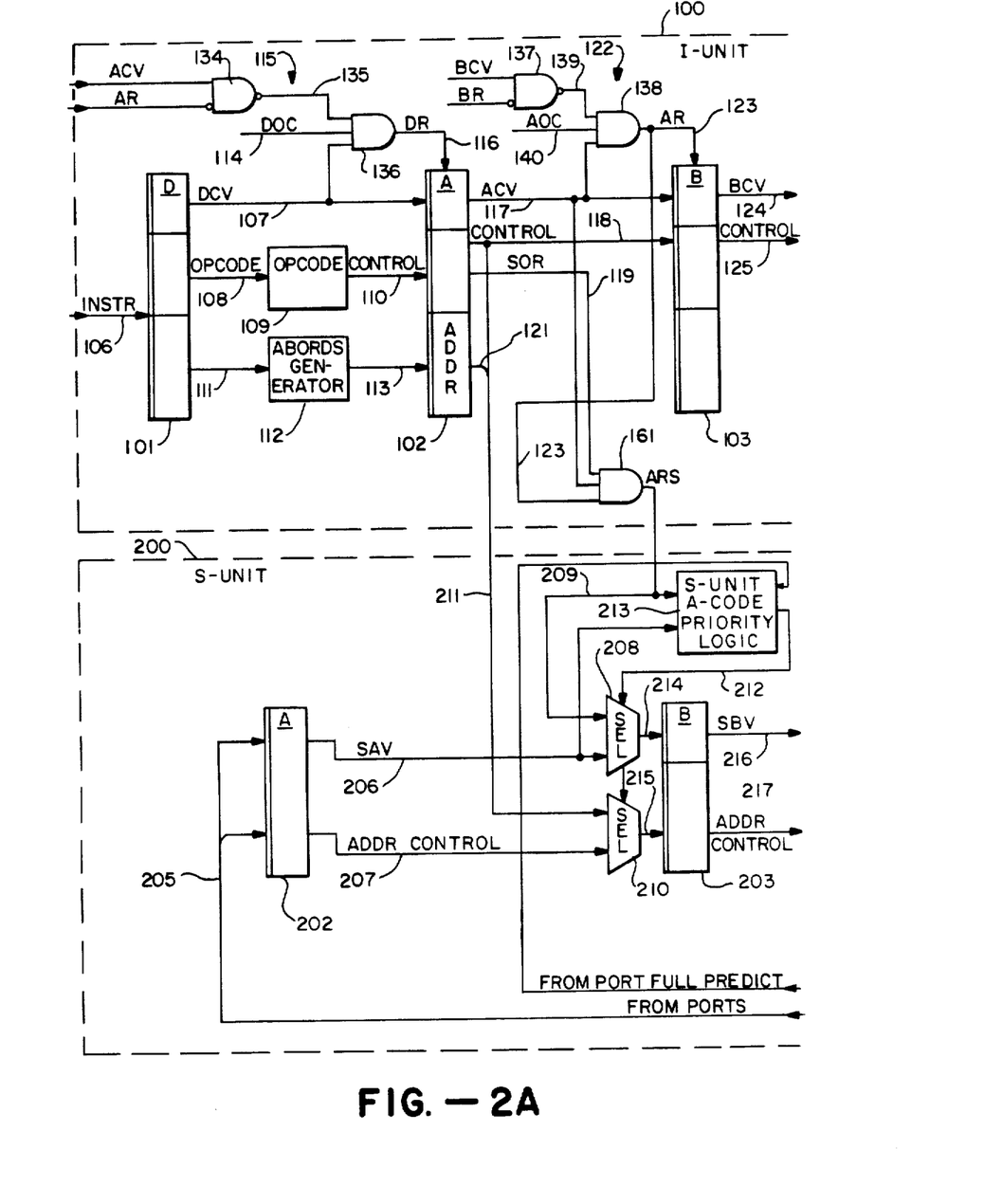
FIGS. 2A and 2B illustrate the instruction unit pipeline and the storage unit pipeline in the preferred embodiment of the present invention.
Figure 2B:
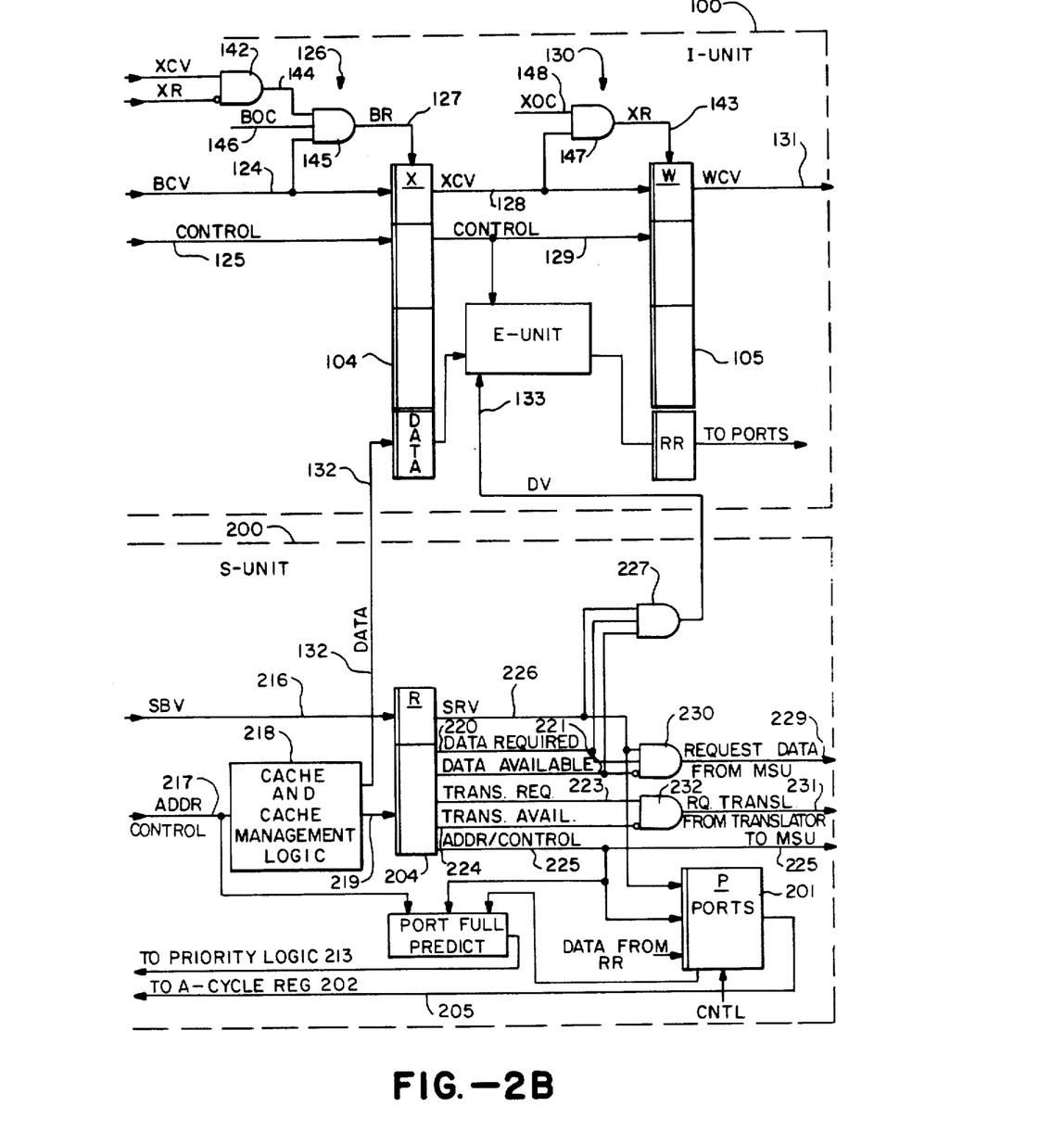
Figure 3A:
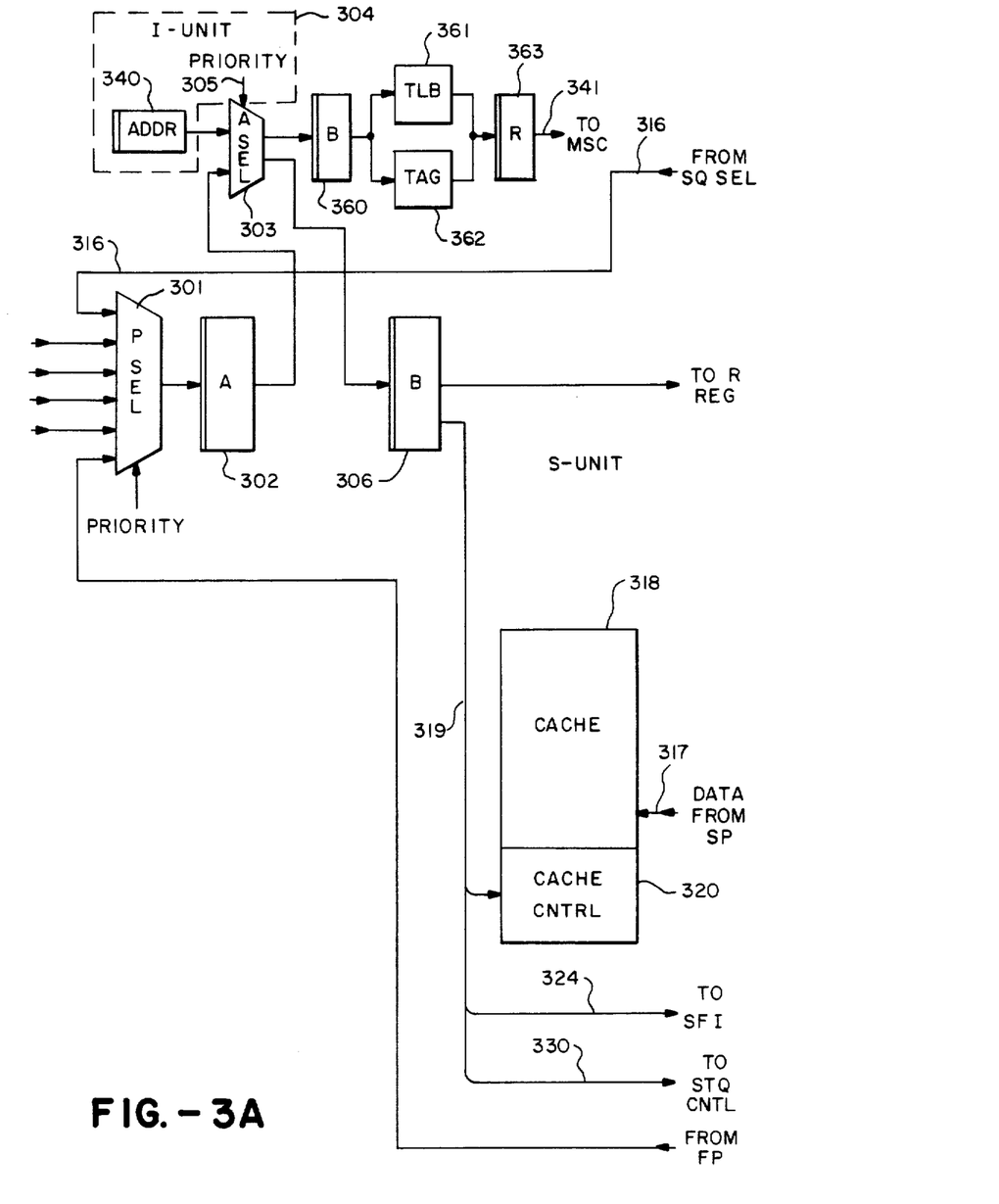
FIGS. 3A and 3B illustrate the storage unit pipeline and the implantation of the storage ports according to the present invention.
Figure 3B:
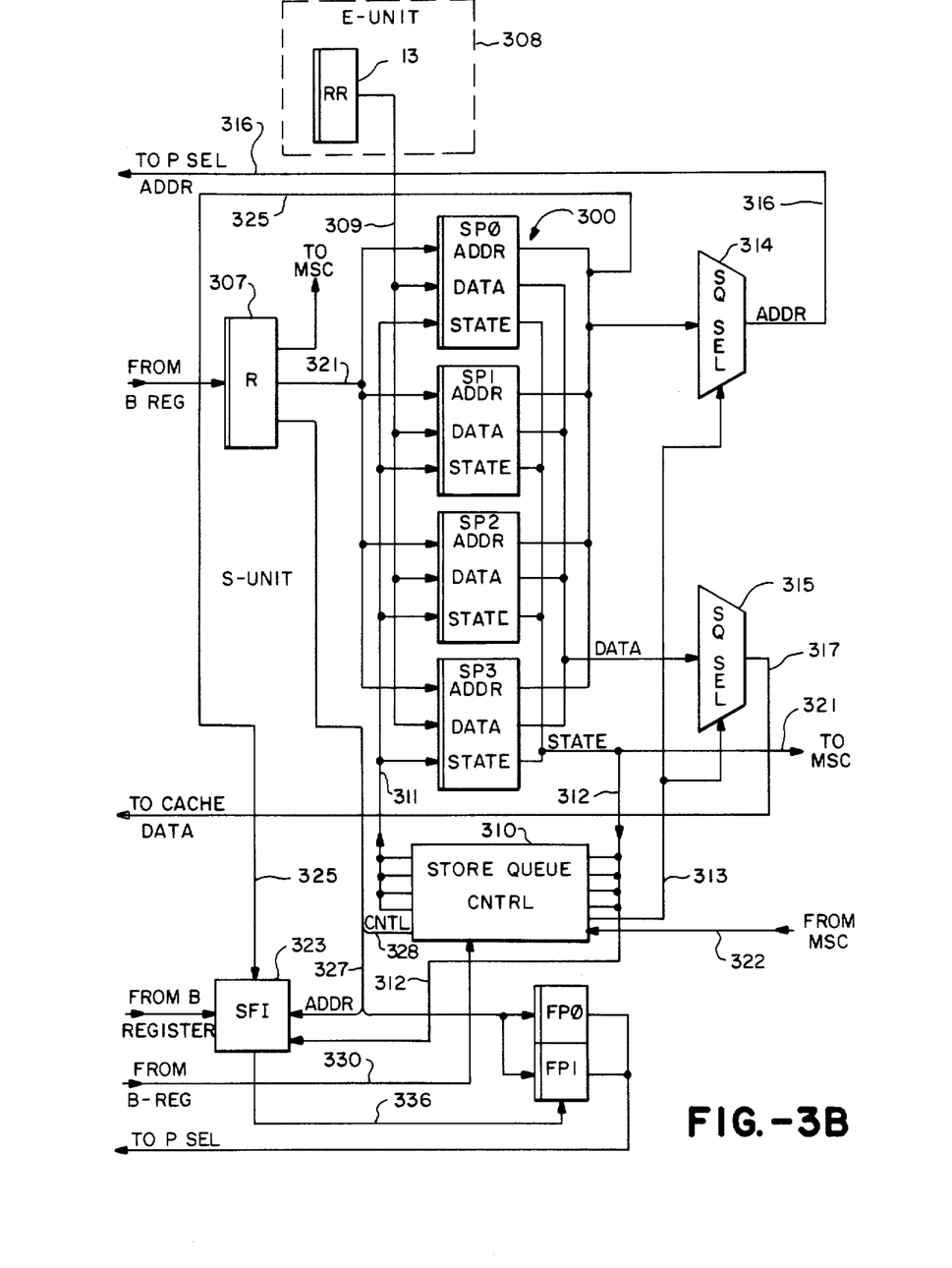
Figure 4A:
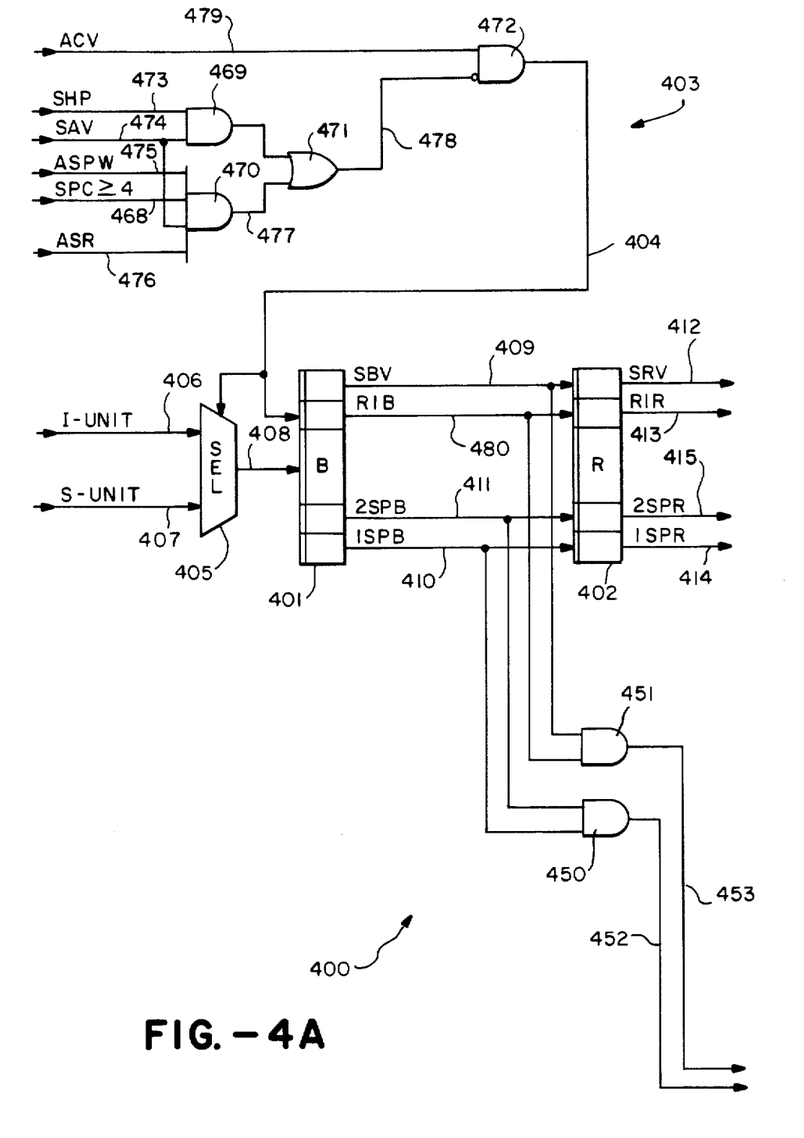
FIGS. 4A and 4B illustrate the means for predicting utilization of the storage ports and the priority logic according to the present invention.
Figure 4B:
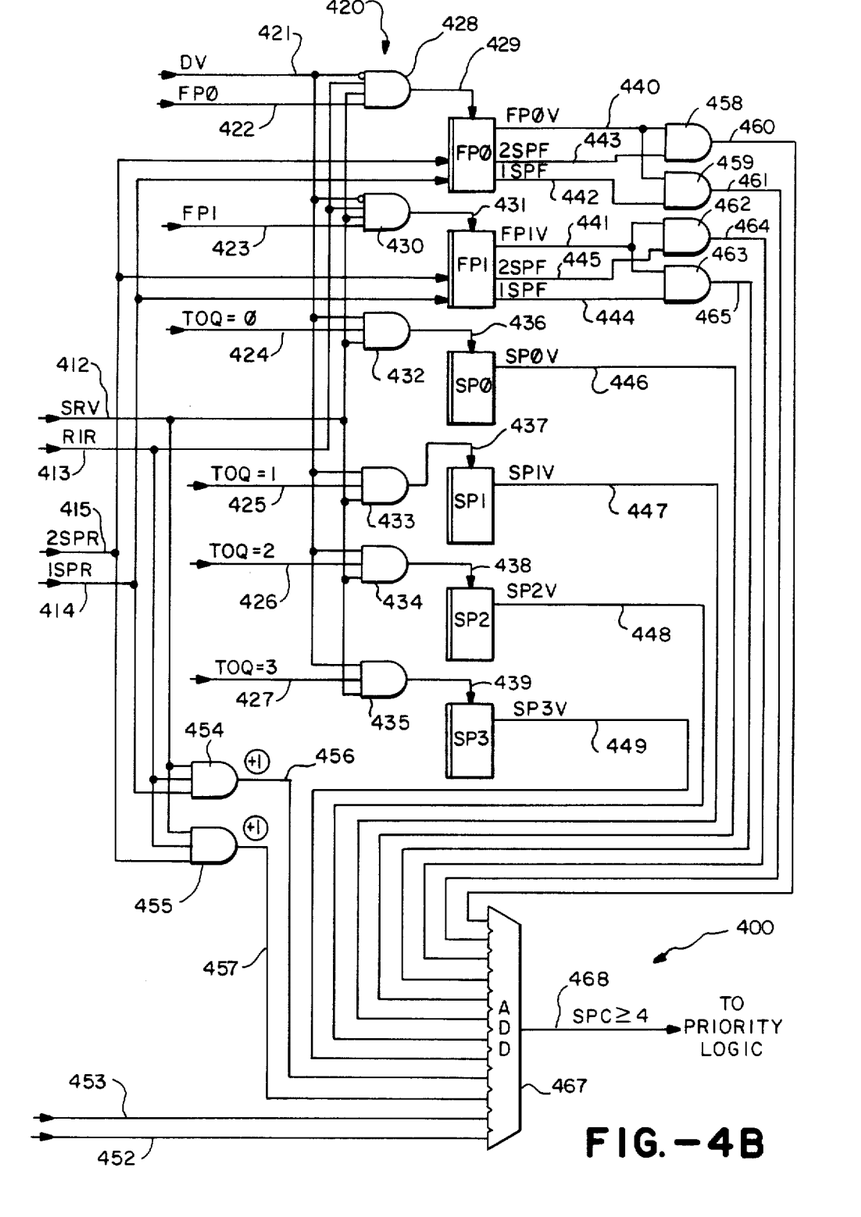

FIG. 1 illustrates an overview of the system incorporating the present invention. FIGS. 2A and 2B illustrate the interface between the instruction unit and the storage unit. FIGS. 3A and 3B illustrate the implementation of the storage unit including a plurality of storage port registers. FIGS. 4A and 4B illustrate the implementation of a means for predicting utilization of the storage ports.

I. Overview

FIG. 1 illustrates the system incorporating the present invention. The system includes an instruction and operand processing complex 10 that includes an instruction unit and execution unit. In addition, the storage unit 11 is provided that includes a means 12 for selecting from competing requests for storage unit resources, a cache including cache control 13, and a plurality of store ports 14. Further, the system includes a main store 15, that stores system data. The instruction unit 10, store ports 14 and main store 15 each generate requests for storage unit resources on lines 16, 17 and 18, respectively, which are coupled to the means 12 for selecting from competing requests. The selected request is supplied on line 19 to the cache 13. After access to the cache 13 or other action by the cache control, the selected requested is passed on line 20 to the store ports 14, to the main store 15 or to the instruction and operand processing complex 10.

In response to a selected request on line 19, data is supplied to the cache 13 from the main store 15 across line 21 or from the store ports 14 across line 22. If data is to be read from the cache, it is supplied across line 23 to the instruction and operand processing complex 10 or across line 24 to the main store. Data is supplied to the store ports 14 from the instruction and operand processing complex 10 across line 25.

Means 12 for selecting from among competing requests operate according to priority logic. The priority logic is designed to maintain the flow of the instruction and operand processing complex 10. Thus a request from the instruction unit across line 16 for priority to the storage unit 17 is a relatively high priority request. Requests from the main store across line 18 can be of higher priority when it is necessary for the main store request to be satisfied for instructions waiting in the instruction and operand processing complex 10. Requests from the store ports across line 17 are typically relatively low priority to maximize throughput of instructions in the instruction and operand processing complex 10.

The present invention is concerned with requests from the instruction unit to store data to the cache 13. When such a request to store data to the cache 13 is selected across line 19, the cache control 13 determines the condition of the cache for the store. When the request is passed on line 20 to the store ports, a particular store port is allocated for the store and waits for results to be supplied across line 25. When the results are supplied across line 25 to an allocated store port, a request is generated on line 17 for access to the cache 13 to store the results. By decoupling the instruction unit data from line 25 from the cache 13 through the store ports 14, the priority of stores from line 25 to the cache 13 is reduced and contention for cache resources is decreased between succeeding instructions in the instruction and operand processing complex 10.

Interface Between the Instruction Unit and Storage Unit

FIGS. 2A and 2B illustrate the interface between the instruction unit 100 and the storage unit 200 of the preferred embodiment of the present invention.

Instruction unit 100 is implemented as a five-stage pipeline processor. The five stages are:

(1) D-Cycle—The instruction to be executed is decoded by the instruction unit.

(2) A-Cycle—The addresses of operands for the instruction are generated by the instruction unit and passed if appropriate to the storage unit.

(3) B-Cycle—The operands are fetched from either the instruction unit general purpose registers or the storage unit cache.

(4) X-Cycle(s)—The execution unit opcodes corresponding to the operation specified by the instruction are executed in the execution unit. More than one X-Cycle may be necessary depending on the complexity of the execution operation.

(5) W-Cycle—The result of the instruction is supplied to the storage unit for storage in the cache or to the instruction unit for storage in general purpose registers.

In FIGS. 2A and 2B, the instruction unit is illustrated schematically along the top half of the figures as a D-stage register 101, an A-stage register 102, a B-stage register 103, an X-stage register 104, and a W-stage register 105.

An instruction is received across line 106 from an instruction fetch mechanism or other source that is not important to the present invention. It is latched into the D-Cycle register 101 during the first step of the flow. The D-cycle register supplies a D-cycle command valid signal DCV on line 107. An opcode from the instruction is supplied across line 108 to a decoder 109 which supplies control signals across line 110. Information in the instruction identifying an operand for use by the opcode on line 108 is supplied across line 111 to address generation logic 112. The address generation logic supplies an address across line 113 in a form for access to the S-Unit 200. upon completion of the functions required during the D-Cycle, a D-Cycle operation complete signal is generated on line 114 by the instruction unit. D-Cycle release logic 115 detects conditions explained below to generate a D-Cycle release signal on line 116 which releases the instruction from the D-Cycle to the A-Cycle.

The A-Cycle register 102 receives the D-Cycle command valid signal on 107, the control on line 110 and the address on line 113 and supplies an A-Cycle command valid signal ACV on line 117, control signals on line 118, a signal indicating that an S-Unit operation is required, SOR, on line 119, a signal indicating that the instruction in the A-Cycle register 102 is in its first A-Cycle FAC on line 120, and address information on line 121. When A-Cycle operations are complete, the AOC signal is generated on line 140. The A-Cycle command valid signal, control signals and address information pass down the pipeline to the B-Cycle register 103 in response to the generation of an A-Cycle release signal AR on line 123 by the A-Cycle release logic 122.

A B-Cycle command valid signal BCV is supplied through the B-Cycle register 103 on line 124, the control information is passed on on line 125.

Proceeding to FIG. 2B, the B-Cycle command valid signal BCV on line 124 and the control on line 125 are supplied to the R-Cycle register 104. When B-Cycle operations are complete, the BOC signal is generated on line 146. B-Cycle release logic 126 generates a B-Cycle release signal BR on line 127 to clock the R-Cycle register 104 to receive the data. An X-Cycle command valid signal XCV is supplied on line 128 from the X-Cycle register 104 as well as control information on line 129. When X-Cycle operations are complete, a XOC signal is generated on line 148.

A W-Cycle register 105 receives the X-Cycle command valid signal XCV from line 128 and the control from line 129 in response to X-Cycle release logic 130. A W-Cycle command valid signal WCV is supplied by the W-Cycle register 105 on line 131 and so on along the pipe.

The X-Cycle register 104 also includes a section for receiving data across line 132 from the storage unit 200. Further, a data valid signal DV is supplied on line 133 from the storage unit 200 when valid data is supplied to the X-Cycle register 104.

The D-Cycle release logic 115 includes NAND-gate 134 that receives as input the A-Cycle command valid signal ACV from line 117 and the A-Cycle release signal AR from line 123. The A-Cycle release signal is inverted at the input of gate 134 on line 135. In addition, AND-gate 136 is included in the D-Cycle release logic receiving as inputs the signal on line 135, the D-Cycle operation complete signal DOC from line 114 and the D-Cycle command valid signal DCV from line 107.

The A-Cycle release logic 122 includes NAND-gate 137 receiving as inputs the B-Cycle command valid signal BCV from line 124 and the inverted B-Cycle release signal BR from line 127. The output of gate 137 is supplied on line 139. AND-gate 138 receives as input the output of gate 137 from line 139, the A-Cycle operation complete AOC signal on line 140 and the A-Cycle command valid signal ACV on line 117, and supplies its output as the A-Cycle release signal AR on line 123.

The B-Cycle release logic on line 126 includes NAND-gate 142 which receives the X-Cycle command valid signal XCV from line 128, the X-Cycle release signal XR from line 143 as inputs and supplies a signal on line 144. In addition, the B-Cycle release logic 126 includes AND-gate 145 receiving the signal from line 144, B-Cycle operation complete signal BOC on line 146 and the B-Cycle command valid signal BCV from line 124 as inputs. The output of gate 145 is the B-release signal BR on line 127.

The X-Cycle release signal on line 143 is supplied as output from AND-gate 147 which receives as inputs the X-Cycle operation complete signal XOC on line 148 and the X-Cycle command valid signal XCV from line 128.

The S-Unit 200 operates in a four-stage pipeline with cycles P-A-B-R. The P-Cycle refers to the cycle in which address information for a flow of the storage unit pipe is latched into ports 201.

The next cycle of the storage unit pipeline is an A-Cycle followed by the B- and R-Cycles. Thus a storage unit includes an A-Cycle register 202, a B-Cycle register 203, and an R-Cycle register 204. During the A-Cycle, an address and control information is loaded from the ports 201 across line 205 to A-Cycle register 202. The A-Cycle register 202 supplies an S-Unit A-Cycle valid signal SAV across line 206. Address and control information is supplied across line 207 from the A-Cycle register 202.

A control signal selector 208 is included which receives as inputs the SAV across line 206 and an A-Cycle request for storage signal ARS across line 209. An address and control selector 210 receives the address and control information across line 207 and address and control information from lines 118 and 121 in the I-Unit 100 across line 211.

The selectors 208 and 210 are controlled by a priority signal on line 212 from S-Unit A-Cycle priority logic 213. The inputs to the S-Unit A-Cycle priority logic 213 include the S-Unit A-Cycle valid signal SAV on line 206 and the A-Cycle request for storage unit signal ARS on line 209.

The priority logic 213 in the preferred embodiment is shown in FIG. 4A. The B-Cycle register latches a selected control signal from selector 208 on line 214 and the selected address and control information from selector 210 on line 215.

Out of the B-Cycle register 203 is supplied an S-Unit B-Cycle valid signal SBV on line 216 and address and control information on line 217. The address and control information on line 217 is supplied as shown in FIG. 2B to the cache and cache management logic 218. The S-Unit B-Cycle valid signal SBV on line 216 is supplied to the R-Cycle register 204. The cache and cache management logic 218, in response to the address and control information from line 217, retrieves data from the cache if available, and supplies it on line 132 to the instruction unit 100. In addition, cache control signals are generated by the cache management logic supplied to the R-Cycle register 204 across line 219. The R-Cycle register 204 latches the control signals including the "data required" signal on line 220, the "data available" signal on line 221, a "translation required" signal on line 223, a "translation available" signal on line 224 and address and control information on line 225. In addition, an S-Unit R-Cycle valid signal SRV is supplied on line 226.

The data valid signal DV on line 133 is supplied from AND-gate 227 which receives as inputs the S-Unit R-Cycle valid signal SRV from line 226, the "data required" signal from line 220, and the "data available" signal from line 221. In addition, gate 227 is enabled or disabled by a staged prefetch request signal as shown in FIGS. 3A-3B.

If data required to be fetched from the main storage unit because it is not present in the cache, a request data from main storage unit signal is generated by AND-gate 230 on line 229. Gate 230 receives as inputs the S-Unit R-Cycle valid signal SRV on line 226, the "data required" signal on line 220, and the inverse of the "data available" signal on line 221. Thus, if data is required and not available for a valid request, the data is requested from the main storage unit. The address and control information is supplied on line 225 to the main storage unit.

In addition, the cache management logic 218 may require other resources to make the data in the cache available for use by the I-Unit 100. For instance, a valid translation of a virtual address must be available in the cache management logic before valid data can be supplied. Thus the control signals "translation required" and "translation available" are generated. If translation resources in the main storage unit are required then a signal on line 231 is generated by AND-gate 232. The inputs to gate 232 include the S-Unit R-Cycle valid signal SRV on line 226, the "translation required" signal on line 223 and the inverse of the "translation available" signal on line 224. In the preferred embodiment, the "data available" signal is not generated in the S-Unit 200 if a translation is required.

The instruction unit 100 presents requests to the storage unit 200 from its A-Cycle register 102 across line 211 during the A-Cycle of the instruction unit pipeline which always corresponds to the A-Cycle of the storage unit pipeline at the instant the request is presented. The storage unit returns data and/or other information to the instruction unit 100 in its R-Cycle from register 204 across lines 132 and 133 upon completion of the request. If all information and resources necessary for completion of the request are available at the time instruction unit 100 makes the request, the presentation of the data valid signal DV indicating completion of the operation will be made just two cycles after the request is issued, that is, in the X-Cycle of the instruction unit pipeline.

The storage unit 200 has a pipeline that is free-running, meaning that it does not have the capability of interlocking for instructions that are unable to complete within a given cycle. If the requested operation is not completed in its initial pass of the pipe, then it must be recycled. The recycling of a request must begin from the P-Cycle from one of the plurality ports 201 of the storage unit pipeline. The fastest possible recycling of the request in the preferred embodiment allows the R-stage register 204 to correspond to the P-stage register of one of the ports in a recycled flow as shown below:

| PIPE FLOW 1 | |
|---|---|
| P A B R | /* initial flow which fails to complete |
| P A B R | /* recycled flow |

If the necessary resource for completing an operation requested by the instruction unit is not initially available, there will thus be a delay of at least three cycles in processing the operation. According to the present invention, by predicting utilization of the store ports, the delay due to unavailability of a store port is reduced from a minimum of three cycles to a delay of only one cycle as described in detail below.

Implementation of Store Ports

FIGS. 3A and 3B illustrate the implementation of the plurality of ports in the storage unit 200 according to preferred implementation of the present invention.

As discussed above, the storage unit pipeline includes a P-stage, A-stage, B-stage and R-stage. For the purpose of illustration of the pipeline, FIGS. 3A and 3B have been drawn to emphasize these pipeline stages. The P-cycle registers include the store ports SP0, SP1, SP2 and SP3, and fetch ports FP0 and FP1. Data from the P-cycle registers are selected through the P-cycle selecting means 301 into A-stage registers 302. The A-stage registers 302 provide data through an A-cycle selector 303 located in the instruction unit 304 according to a priority control on line 305 generated as shown in FIGS. 4A-4B. The selected data is loaded into a B-stage register 306. Data in B-stage registers 306 are used for a cache access, after which R-stage registers 307 are loaded.

The A-cycle selector 303 in the instruction unit 304 also supplies the selected address to a storage unit (S-UNIT) B-cycle register 360. The address in the B-cycle register 360 is used to access a translation lookaside buffer 361 and a cache tag 362 to verify the presence of the addressed data in the cache 318 and to supply a system address to an S-UNIT R-cycle register 363. The system address is supplied on line 341 to a main store controller MSC, corresponding to lines 225 in FIGS. 2A and 2B.

The pipeline in the instruction and execution units is not illustrated in FIGS. 3A and 3B. However, the result register 13 is shown residing in the execution unit 308. Results posted in the result register 13 are supplied over line 309 to the store queue 300.

Address information for the results is supplied through a register 340 in the I-UNIT pipeline to the A-cycle selector 303, through which it is staged through the S-UNIT pipeline B- and R-stages to an allocated store port SP0-SP3. In the preferred implementation, a logical address is used for cache accesses that is translated into a system address for main store accesses as mentioned above. The system address is supplied over line 341 to the main store controller MSC for use in set change bit and move-in operations.

In the implementation shown in FIGS. 3A and 3B, there are four store ports SP0, SP1, SP2 and SP3, each storing address information for the results stored in the respective port, the result data itself and state information for the respective port.

The implementation includes a store queue control means 310 for generating and updating the state information across lines 311 and 312. In addition, the store queue control means 310 operates to generate a top-of-queue pointer across line 303 for supply to the store queue selectors 314 and 315. The store queue selectors 314 and 315 operate to select the address information and data, respectively, from the store port indicated by the top-of-queue pointer on line 313. The top-of-queue pointer is generated in the store queue control means 310 in response to the state information and a flow of the storage unit pipeline.

The address information selected by the store queue selector 314 is supplied over line 316 as one input to the P-cycle selecting means 301. The data selected by the store queue selector 315 is supplied over line 317 directly to the high speed cache 318. The storage unit control (not shown) generates a priority signal from which the P-cycle selector 301 may select the address information on line 316 from the store queue selector before loading into the A-stage register 302. The A-cycle selector 303 may then select the address information from the A-stage register 302 for loading into the B-stage register 306. The address information in the B-stage register 306 is supplied on line 319 to the cache controller 320 which, responsive to the address information on line 319, enables the cache to load the data from line 317. Information from the B-stage registers 306 is loaded into the R-stage registers indicating the results of the cache access occurring after the B-stage.

The state information stored in the store ports is supplied over line 321 to the main storage controller for use in the line not present and set change bit operations mentioned above. In addition, control information from the main storage controller comes in on line 322 to the store queue controller.

Information in the B-stage registers indicating a successful store of store port data is also supplied to the store queue control means 310 across line 330. The store queue control means 310 responds to this information by updating the top-of-queue state of each of the store ports and updating the state information in the store port from which the data was successfully stored. The store port(s) transition to the store complete state following their cache write flow.

In order to simplify the diagram in FIGS. 3A and 3B, the means for predicting utilization of the store ports SP0 through SP3 is not shown. However, it is shown in detail in FIGS. 4A and 4B as described below. In addition, FIGS. 4A and 4B illustrate an implementation of the priority logic generating a priority signal on line 305 of FIGS. 3A and 3B.

Implementation of Store Port Full Prediction

FIGS. 4A and 4B illustrate preferred implementation of the means 400 for predicting the utilization of the storage ports SP0 through SP3. For simplicity, FIGS. 4A and 4B illustrate the B-stage register 401, R-stage register 402, and the store ports SP0 through SP3 and the fetch ports FP0 and FP1 of the storage unit pipeline in a manner that emphasizes the means for predicting store port utilization.

In FIG. 4A, the priority logic 403 is shown generating a signal on line 404 for controlling the selection of competing requests for storage unit resources in selector 405. The selector 405 corresponds with selector 303 of FIGS. 3A and 3B and selectors 208 and 210 of FIGS. 2A and 2B. For simplicity, a request from the instruction unit is provided on line 406 and requests from the storage unit are provided on line 407. Other sources of requests for storage unit resources are not shown.

A selected request is provided on line 408 to the B-stage register. The storage unit generates an S-unit B-Cycle valid signal for storage in the B-stage register and latches a control signal from line 404 that a request from the I-unit has been selected and resides in the B-stage register 401. In addition, a signal indicating whether one or more storage ports will be required to satisfy the request in the B-stage registers is generated on line 410. If two storage port registers will be required to satisfy the request of the B-stage register, a signal is generated on line 411. During a given cycle, a request residing in the R-stage register also will include the S-unit R-stage valid signal on line 412, an indicator that the request residing in the R-stage register came from the I-unit on line 113, a signal indicating that at least one store port will be required to satisfy the R-stage request on line 114, and a signal indicating that two store port registers will be required on line 415.

Allocations after the R-Cycle of fetch ports FP0 and FP1 or storage ports SP0 through SP3 is controlled by logic 420. The logic 420 receives control signals including the data valid signal as shown in FIG. 2B at line 133, on line 421. In addition, the fetch port control generates a signal for allocation of fetch port 0 on line 422 or for allocation of fetch port 1 on line 423 as appropriate. The top of queue indicator from the storage port control generates signal on line 424 when store port 0 is at the top of the queue, a signal on line 425 for store port 1, a signal on line 426 for store port 2, and a signal on line 427 for store port 3. Also, the S-unit R-Cycle valid signal on line 412 and the R-Cycle request from instruction unit signal on line 413 are supplied.

Fetch port 0 is allocated when data valid is not true, fetch port 0 is selected by the fetch port control and the S-Unit R-Cycle valid signal on line 412, the R-Cycle request from instruction unit signal on line 413 are true as indicated by the output of AND-gate 428 on line 429.

Likewise, fetch port 1 is allocated in response to the output of AND-gate 430 on line 431. The inputs to AND-gate 430 include the inverse of data valid signal on line 421, the fetch port 1 control signal from line 423, the S-Unit R-Cycle valid signal from line 412 and the R-Cycle request from instruction signal on line 413.

The store ports are allocated in response to the outputs of AND-gates 432, 433, 434 and 435. Each of the AND-gates 432 through 435 receive as inputs the data valid signal from line 421 and the S-Unit R-Cycle valid signal from line 412. In the event that the respective top of queue pointer corresponds to the store port to which a particular AND-gate 432 through 435 is connected, the outputs of the respective AND-gates 436 through 439 clock storage ports for allocation.

The fetch ports FP0 and FP1, when allocated, store control signals including a fetch port valid signal FP0 valid on line 440 and FP1 valid on line 441 indicating that respective fetch ports include valid fetch requests. If the fetch request in the fetch ports will require store port facilities, then the respective fetch ports will generate control signals. If FP0 will require one store port or more, then a signal on line 442 is generated, if two store ports will be required, then a signal is generated on line 443. Likewise, if FP1 will require one or more store ports, then a signal is generated on line 444 and if two store ports will be required, then a signal is generated on line 445.

Allocated store ports when valid will include a store port valid signal. Thus, SP0 will generate a SP0 valid signal on line 446. SP1 will generate a SP1 valid on line 447. SP2 will generate a SP2 valid on line 448. If SP3 contains valid data, then a SP3 valid signal is generated on line 449.

In order to predict utilization of the store ports, all possible sources of store port allocations must be counted. Thus, logic is included as described below for counting possible store port allocations residing in the pipeline of the storage unit at a given time.

The B-Cycle register 401, the 2 store port required signal on line 410, and the 2 store port required signal on line 411 are supplied as inputs to AND-gates 450 and 451, respectively. The other inputs to the AND-gates 450 and 451 include the S-Unit B-Cycle valid signal from line 409 and the B-Cycle request from instruction unit signal from line 480. The output of the AND-gate 450 is asserted when one or more store ports could be required for the request residing in the B-Cycle. The output of AND-gate 451 is asserted when two store ports could be allocated. The signals are supplied on lines 452 and 453, respectively.

The R-Cycle register 402 likewise could include a request that will require store port allocation. Thus, the 2 store port required signal from line 415 and the 1 store port required signal from line 414 are suplied as inputs to AND-gates 454 and 455, respectively. The other inputs to AND-gates 454 and 455 include the S-Unit R-Cycle valid signal from line 412 and the R-Cycle request from instruction unit signal from line 413. Thus, a signal is asserted from gate 454 on line 456 when at least one store port will be required to service the request residing in the R-stage register 402. A signal is asserted from gate 455 on line 457 when two store ports will be required for servicing the request residing in the R-stage register 402.

The fetch ports also could result in allocation of store ports. Thus AND-gate 458 and AND-gate 459 receive as inputs the 2 store port required for fetch port 0 signal on line 443 and the 1 store port required from fetch port 0 signal on line 442, respectively. The other input to AND-gates 458 and 459 is the fetch port 0 valid signal on line 440. Thus, the output 460 for 60 of gate 458 is asserted when two store ports could be allocated from fetch port 0 and the output 461 from gate 459 is asserted when one or more store ports could be allocated from fetch port 0.

For fetch port 1, AND-gates 462 and 463 receive as inputs the 2 store port required from fetch port 1 signal on line 445 and the 1 store port required from fetch port 1 signal on line 444, respectively. The other input to AND-gates 462 and 463 is the fetch port valid signal on line 441. Thus, the signal on line 464 is asserted when two store ports could be allocated from fetch port 1 and the signal on line 465 is asserted when one or more store ports from fetch port 1 could be allocated.

Allocated store ports generate respective store port valid signals on lines 446 through 449 as discussed above.

Each of the signals indicating the possibility of allocation of a store port or the actual allocation of a store port is supplied to an adder 467 which generates a store port count signal on line 468. Thus, adder receives as inputs the signals on lines 452, 453, 456, 457, 460, 461, 464, 465, 446, 447, 448 and 449. The store port count signal on line 468 is supplied to the priority logic 403 shown in FIG. 4A.

In the embodiment shown, the priority logic 403 includes AND-gates 469 and 470 which supply their outputs to OR-gate 471. The output of OR-gate 471 is supplied as an inverted input to AND-gate 472.

AND-gate 469 receives as one input an S-Unit high priority request signal SHP on line 473 and an S-Unit A-Cycle valid signal on line 474.

The input to AND-gate 470 includes an A-Cycle store port write signal ASPW in the S-Unit on line 475 which is generated when a request residing in the A-Cycle will require a write from a storage port. In addition, the store port count signal SPC on line 468 is supplied as a second input. Further, the S-Unit A-Cycle valic signal SAV is supplied as an input to gate 470 on line 474. The fourth input to gate 470 is the I-Unit store request signal ISR from line 476 which is generated when the instruction unit is requesting a store of data to cache.

According to the present invention, there is the possibiity of 12 sources of allocated or possibly allocated store ports that could reside in the storage unit pipeline at given time, but there are only four store ports. Thus, when the store port count signal is greater than or equal to four, the store port count greater than four signal SPC4 is asserted. So, when a store port is requesting access to the storage unit resources in its A-Cycle as indicated by the signal on line 475, the store port count is greater than or equal to four as indicated by the signal on line 468 and the instruction unit is requesting allocation of a store port that may encounter all full store ports, the priority of the request indicated by the ASPW signal from the S-Unit is increased as indicated by the output of AND-gate 470 on line 477. When the output of AND-gate 470 goes true, the output of OR-gate 471 goes true on line 478, resulting in disabling the A-Cycle command valid signal on line 479 from obtaiing priority for the instruction unit. Thus, the signal supplied on line 404 to selector 405 selects the storage unit request from line 407 and a store port is freed before the instruction unit storage request is allowed to pass to the next cycle.

AND-gate 469 will provide similar priority by bumping an instruction unit request for other high priority storage unit requests as indicated on line 473 that are not important to the present invention.

As mentioned above, requests from the instruction unit are issued to the S-Unit in the A-Cycle of the instruction unit and responses are returned by the storage unit to the instruction unit in the S-Unit R-Cycle. If the storage unit does not complete an operation during an initial flow, when the instruction unit reaches the X-Cycle, the instruction unit pipeline interlocks waiting for the storage unit to complete the operation such as a storage to the high speed cache, requests by the instruction unit when the store queue is full in illustrated in two case examples below. In Case 1, a system with a store queue is described with no store queue full prediction mechanism according to the present invention. In this case, an isolated store request from the instruction unit is delayed up to five cycles due to the store queue being full.

| PIPE FLOW NO. 2 |
|---|
| I-unit pipeline: |
| D A B X W                /* request1 (may or may not be a store) */ |
|    D A B X X X X X X W /* request2 (store) delayed 5 cycles */ |
|      D A B B B B B B X W      /* request3 */ |
|        D A A A A A A B X W     /* request4 */ |
| S-unit pipeline: |
| P A B R      /* i-unit request1 |
|   P A B R      /* i-unit request2 (store) (finds store queue full) |
|       P A B R      /* i-unit request3 |
|        P A B R      /* i-unit request4 (prefetch) |
|         P A B R      /* store port write |
|          P A B R      /* recycle i-unit request1 |
|           P A B R      /* recycle i-unit request2 |
|            P A B R      /* reissued i-unit request3 |

For the same case in which an isolated store request is made, the following pipeline flow diagram shows the same series of instructions with the store queue full prediction mechanism of the present invention.

| PIPE FLOW NO. 3 |
|---|
| I-unit pipeline: |
| D A A B X W      /* request1 (may or may not be a store) */ |
|    D D A B X W      /* request2 (store) delayed 1 cycle */ |
|       D A B X W      /* request3 */ |
|         D A B X W      /* request4 */ |
| S-unit pipeline: |
| P A B R      /* i-unit request1 (store) (fills store queue) |
| P A B R      /* store port write (second store request is delayed) |
|    P A B R      /* i-unit request2 (store) |
|     P A B R      /* i-unit request3 |
|      P A B R      /* i-unit request4 |

For Case 2, in which a series of store requests are provided in the instruction unit pipeline in a row, the following pipeline flow diagram illustrates the mechanism without the store queue full prediction mechanism.

| PIPE FLOW NO. 4 |
| --- |
| D A B X W          /* store which fills the store port */ |
| D A B X X X X X X W          /* five-cycle delay */ |
|   D A B B B B B B X X X X W          /* three-cycle delay */ |
|     D A A A A A A B B B B X X X W          /* three-cycle delay */ |
|       D D D D D D A A A A B B B X X X W/* three-cycle delay*/ |
| P A B R     /* i-unit request0 (store) (fills store queue) |
|  P A B R     /* i-unit request1 (store) |
|   P A B R     /* i-unit request2 (store) |
|    P A B R     /* i-unit request3 (prefetch) |
|     P A B R     /* store port write |
|      P A B R     /* recycle i-unit request1 |
|       P A B R     /* recycle i-unit request2 |
|        P A B R     /* reissued i-unit request3 (store) |
|         P A B R     /* store port write |
|          P A B R     /* recycle i-unit request2 |
|           P A B R     /* recycle i-unit request3 |
|            P A B R     /* store port write |

The following pipeline flow diagram illustrates to series of requests as shown above with the store queue full mechanism of the present invention.

| PIPE FLOW NO. 5 |
| --- |
| D A B X W |
|  D A A B X W          /* one-cycle delay */ |
|   D D A A B X W          /* one-cycle delay */ |
|    D D A A B X W          /* one-cycle delay */ |
|     D D A A B X W          /* one-cycle delay */ |
| P A B R     /* i-unit request1 (store (fills store queue) |
|  P A B R     /* store port write (second store request is delayed) |
|   P A B R     /* i-unit request2 (store) |
|    P A B R     /* store port write (next store request is delayed) |
|     P A B R     /* i-unit request3 (store) |
|      P A B R     /* store port write |
|       P A B R     /* i-unit request4 (store) |

Conclusion

According to the present invention, the store queue full prediction mechanism consists of three primary parts.

The first, the instruction unit, must have the ability to quickly decode instructions to predict the occurrence of a new store request being generated. This prediction must be available at the time the request is validated by the instruction unit in the A-Cycle.

Store queue utilization counting circuitry for predicting whether a store port will be available for a new storage by the instruction unit must be provided. The count must include a count of all store ports actually allocated, plus counts for store ports to be allocated for requests already being processed by the storage unit. The amount must be reduced by the number of store ports for which writes are in process of happening but for which the effect of the write has not been reflected in the store port control logic.

The priority circuitry for selecting requests to the storage unit including write flows from the store port to the storage unit pipeline must respond to the prediction of store port utilization to provide priority to the store port write flow.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

We claim:

1. A data processing apparatus comprising:

storage means for storing data at data locations identifiable by addresses;

instruction processing means for processing a sequence of instructions including means, connected to receive the sequence of instructions, for decoding an instruction in the sequence to generate control signals including a request for storage of resulting data to the storage means for storing the resulting data at a data location and an address identifying the data location, and other requests for access to a data location and corresponding addresses, means, connected to receive a subset of the control signals, for executing decoded instructions to generate the resulting data; and storage port means, connected to receive resulting data from the executing means and having at least one register for holding the address and resulting data from the execution of an instruction when allocated to the instruction, for generating a request for access to the storage means for storing the resulting data at a data location identified by the address in the at least one register, the at least one register being in a free state if it is not allocated;

access control means, connected to receive a plurality of requests for access to the storage means including the requests for storage of resulting data and corresponding addresses from the storage port means and the decoding means, for processing a sequence of requests for access to the storage means including means for allocating the at least one register in the storage port means if it is free to the requesting instruction in response to a request from the decoding means to store resulting data to, means for accessing the storage means in response to other requests for access to the storage means, and means for selecting from the plurality of received requests one request for processing next in the sequence by the access control means in response to a priority signal; and priority logic means, connected to the decoding means, the storage port means and the access control logic, for generating the priority signal indicating the request for selection by the selecting means including means for predicting whether at the time of a request for storage of resulting data from the decoding means, whether at least one register in the storage port means will be free at the time of allocation and if the predicted state of at least one register is not free, then increasing the priority of a request from the storage port means.

2. The apparatus of claim 1, wherein the access control means includes a pipeline having a plurality of stages following the means for selecting in which a plurality of requests for access to the storage means can be processed in different stages of the pipeline at a time; and the means for predicting includes:

means, in communication with each stage in the pipeline following the means for selecting, for detecting requests from the decoding means for storage of resulting data.

3. The apparatus of claim 1, wherein the storage port means includes a plurality of registers for holding an address and resulting data from a plurality of requests for storage of resulting data from the decoding means.

4. The apparatus of claim 2, wherein the storage port means includes a plurality of registers for holding an address and resulting data from a plurality of requests for storage of resulting data from the decoding means.

5. The apparatus of claim 4, wherein requests for storage of resulting data from the decoding means may require allocation of more than one register in the storage port means, further including:

means, associated with each stage in the pipeline following the means for selecting, for indicating the number of registers in the storage port means to be allocated by the request in the associated stage.

6. The apparatus of claim 5, wherein said means for predicting includes means, in communication with the means for indicating the number of registers to be allocated by requests in each stage and with the storage port means, for counting the total number of registers to be allocated in all stages following the means for selecting and already allocated; and means for supplying a store port full signal to the priority logic means when the number of registers to be allocated is equal to or greater than the number of registers in the storage port means.

* * * * *

UNITED STATES PATENT AND TRADEMARK OFFICE
CERTIFICATE OF CORRECTION

PATENT NO. : 4,722,046

DATED : January 26, 1988

INVENTOR(S) : Kasrazadeh, et al.

It is certified that error appears in the above-identified patent and that said Letters Patent is hereby corrected as shown below:

Title Page:

In the Abstract: line 8: "completing" should be "competing"

In the Specification:

Column 3, line 2: "Implantation" should be "implementation"

Column 6, line 9: "SAV across" should be "SAV signal across"

Column 8, line 39: "across line 303" should be "across line 313"

Column 11, line 49: "valic" should be "valid"

Column 12, line 3 to 4: "obtaiing" should be "obtaining"

Column 14, line 64: "means, whether at least one" should be "means at least one"

Signed and Sealed this

Twenty-ninth Day of November, 1988

*Attest:*

DONALD J. QUIGG

*Attesting Officer*      *Commissioner of Patents and Trademarks*